(12) United States Patent
Bailie et al.

(10) Patent No.: US 8,302,235 B1
(45) Date of Patent: Nov. 6, 2012

(54) RAMP ASSEMBLY

(75) Inventors: David A. Bailie, Kent, WA (US); Mark S. Celich, Auburn, WA (US)

(73) Assignee: Homecare Products, Inc., Auburn, WA (US)

( * ) Notice: Subject to any disclaimer, the term of this patent is extended or adjusted under 35 U.S.C. 154(b) by 431 days.

(21) Appl. No.: 12/109,287

(22) Filed: Apr. 24, 2008

Related U.S. Application Data

(60) Provisional application No. 60/913,792, filed on Apr. 24, 2007.

(51) Int. Cl.
*E01D 1/00* (2006.01)
(52) U.S. Cl. .......................................... 14/69.5; 414/537
(58) Field of Classification Search ................. 14/69.5, 14/71.1, 71.3; 414/927, 537
See application file for complete search history.

(56) References Cited

U.S. PATENT DOCUMENTS

| | | | |
|---|---|---|---|
| 3,339,968 A | 9/1967 | Hall | |
| 3,352,440 A | 11/1967 | Wilson | |
| 3,424,323 A * | 1/1969 | Barnaby | 414/537 |
| 3,491,394 A * | 1/1970 | Le Clear | 14/69.5 |
| 3,538,528 A * | 11/1970 | Jacobson et al. | 14/71.5 |
| 3,580,404 A | 5/1971 | Moser | |
| 3,675,800 A | 7/1972 | Weyant | |
| 3,763,827 A | 10/1973 | Burkart | |
| 3,777,921 A | 12/1973 | Nelson | |
| 3,834,565 A | 9/1974 | Goodman, Jr. | |
| 3,984,891 A | 10/1976 | Weinmann | |
| 4,528,711 A | 7/1985 | Packer | |
| 4,647,270 A | 3/1987 | Maloney | |
| 4,700,421 A | 10/1987 | Gladney | |
| 4,795,304 A | 1/1989 | Dudley | |
| 4,900,217 A | 2/1990 | Nelson | |
| 4,913,615 A | 4/1990 | Ward | |
| 4,934,894 A | 6/1990 | White | |
| 4,990,049 A | 2/1991 | Hargrove | |
| 5,062,174 A | 11/1991 | DeSalvo | |
| 5,133,634 A | 7/1992 | Gingrich | |
| 5,145,308 A | 9/1992 | Vaughn | |
| 5,156,432 A | 10/1992 | McCleary | |
| 5,170,976 A | 12/1992 | Lundman | |
| 5,211,437 A | 5/1993 | Gerulf | |
| 5,253,410 A | 10/1993 | Mortenson | |
| 5,273,335 A | 12/1993 | Belnap | |
| 5,287,579 A | 2/1994 | Estevez, Jr. | |

(Continued)

FOREIGN PATENT DOCUMENTS

DE    3326027 A1    1/1985

(Continued)

OTHER PUBLICATIONS

Office Action mailed Feb. 22, 2010, from U.S. Appl. No. 11/697,648, filed Apr. 6, 2007, 9 pages.

(Continued)

*Primary Examiner* — Gary S Hartmann
(74) *Attorney, Agent, or Firm* — Christensen O'Connor Johnson Kindness PLLC

(57) ABSTRACT

A ramp assembly for a vehicle generally includes a ramp platform having a top substantially planar tread surface and first and second ends, and an extension section movably coupled to the first end of the ramp platform at an interface, wherein the extension section is configured to move between a first extension section orientation and a second extension section orientation.

19 Claims, 6 Drawing Sheets

U.S. PATENT DOCUMENTS

| | | |
|---|---|---|
| 5,342,105 A | 8/1994 | Miles |
| 5,380,145 A | 1/1995 | Czaplewski |
| 5,451,088 A | 9/1995 | Broad |
| 5,458,389 A | 10/1995 | Young |
| 5,462,398 A | 10/1995 | Hymer |
| 5,476,202 A | 12/1995 | Lipp |
| 5,538,308 A | 7/1996 | Floe |
| 5,540,474 A | 7/1996 | Holland |
| 5,608,937 A | 3/1997 | Seigneur |
| 5,645,394 A | 7/1997 | Hays |
| 5,649,732 A | 7/1997 | Jordan |
| 5,697,754 A | 12/1997 | Raymer |
| 5,752,636 A | 5/1998 | Manley |
| 5,768,733 A | 6/1998 | Kneebone |
| 5,813,714 A | 9/1998 | Lipinski |
| 5,816,767 A | 10/1998 | Mann |
| 5,836,028 A | 11/1998 | Petersen |
| 5,899,655 A | 5/1999 | Miller |
| 5,907,276 A | 5/1999 | Lance |
| 5,950,890 A | 9/1999 | Darby |
| 6,076,215 A * | 6/2000 | Blankenship et al. ......... 14/71.1 |
| 6,296,290 B1 | 10/2001 | Wolf |
| 6,430,769 B1 | 8/2002 | Allen |
| 6,736,279 B2 | 5/2004 | Allen |
| 7,082,637 B1 | 8/2006 | Griffin |
| 7,100,231 B2 | 9/2006 | Peschmann |
| 7,237,294 B2 | 7/2007 | Lensing |
| 7,526,826 B2 | 5/2009 | Bailie |

FOREIGN PATENT DOCUMENTS

| | | |
|---|---|---|
| GB | 370353 | 4/1932 |
| WO | 89/06199 A1 | 7/1989 |

OTHER PUBLICATIONS

Amendment After Non-Final Rejection dated May 24, 2010, in response to Office Action mailed Feb. 22, 2010, from U.S. Appl. No. 11/697,648, filed Apr. 6, 2007, 9 pages.

Final Office Action mailed Jul. 14, 2010, from U.S. Appl. No. 11/697,648, filed Apr. 5, 2007, 5 pages.

Amendment Submitted With RCE dated Dec. 14, 2010, in response to Final Office Action mailed Jul. 14, 2010, from U.S. Appl. No. 11/697,648, filed Apr. 5, 2007, 7 pages.

Notice of Allowance and Fee(s) Due mailed Jan. 25, 2011, from U.S. Appl. No. 11/697,648, filed Apr. 5, 2007, 4 pages.

* cited by examiner

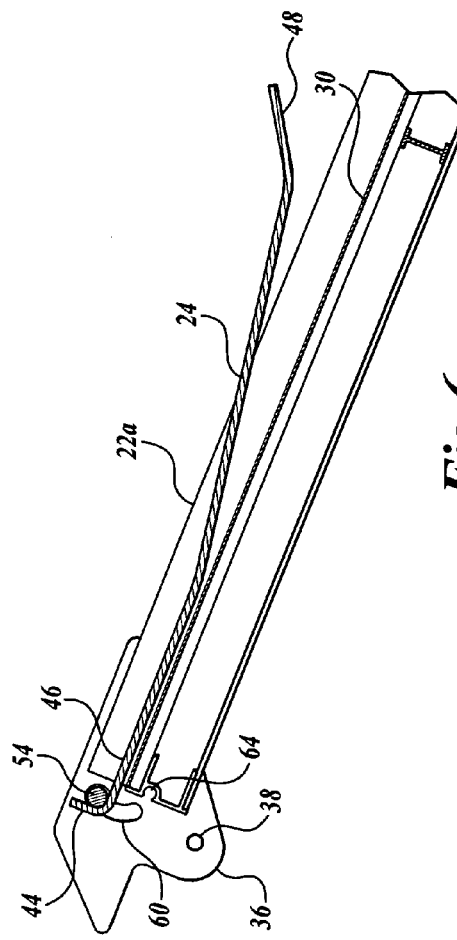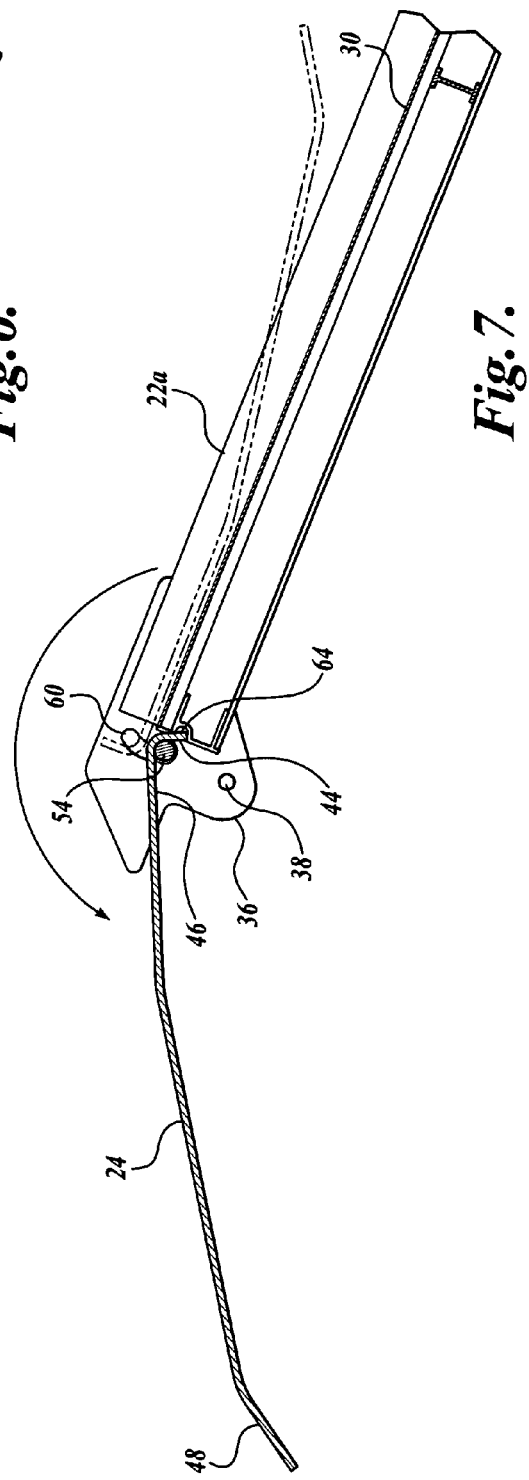

RAMP ASSEMBLY

CROSS-REFERENCE TO RELATED APPLICATION

This application claims the benefit of U.S. Provisional Patent Application No. 60/913,792, filed Apr. 24, 2007, the disclosure of which is hereby expressly incorporated by reference.

BACKGROUND

Portable ramp assemblies provide a portable inclined surface on which a user can travel between lower and upper elevation surfaces, for example, for access over a set of stairs or into a vehicle. Such ramp assemblies include a ramp platform and may include one or more transition plates for providing transition surfaces or resting contacts from a surface of a lower elevation to the ramp platform and from the ramp platform to a surface of an upper elevation.

In some ramp assemblies, for example, in vehicle hitch-mounted folding ramp assemblies, the transition from the ramp platform is ill-suited or incompatible with, for example, an upper elevation surface, such as a lip at the rear hatch of a car or SUV or the pick-up bed of a truck. In addition, the ramp platform may not fully extend to reach the upper elevation surface, thereby leaving a gap between the ramp platform and the upper elevation surface and requiring a ramp extension plate to bridge the two surfaces. Moreover, in the case of a vehicle hitch-mounted ramp assembly, which may be mounted on the vehicle hitch in a substantially vertical stowed orientation, the ramp extension plate may need to be removed or disassembled to allow the ramp to properly be positioned into its stowed orientation. The extension plate must then be reattached when the ramp is positioned into its extended orientation. Such removing and reattaching of the ramp extension plate not only creates a hassle for the user, but further may result in loss or damage to critical parts of the ramp assembly.

Therefore, there exists a need for an improved, integrated transition surface for a ramp assembly that can remain coupled to the ramp assembly when the ramp assembly is being transitioned between ramp stowed and ramp extended orientations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A ramp assembly for a vehicle in accordance with one embodiment of the present disclosure is provided. The assembly generally includes a ramp platform having a top substantially planar tread surface and first and second ends, and an extension section movably coupled to the first end of the ramp platform at an interface, wherein the extension section is configured to move between a first extension section orientation and a second extension section orientation.

A ramp assembly for a vehicle in accordance with another embodiment of the present disclosure is provided. The assembly generally includes a ramp platform having a top substantially planar tread surface and first and second ends, wherein the ramp platform is movable between a first ramp orientation and a second ramp orientation. The assembly further includes an extension section pivotally coupled to the first end of the ramp platform to provide a transition surface from the first end of the ramp platform to the vehicle, wherein the extension section is configured to pivot between a first extension section orientation corresponding with the first ramp orientation and a second extension section orientation corresponding with the second ramp orientation.

A ramp assembly for a vehicle in accordance with another embodiment of the present disclosure is provided. The assembly generally includes a ramp platform having a top substantially planar tread surface and first and second ends. The ramp assembly further includes an extension section pivotally coupled to the first end of the ramp platform at an interface to provide a transition surface from the first end of the ramp platform to the vehicle, wherein the extension section is configured to pivot between a first extension section orientation and a second extension section orientation. The interface includes a pivoting device and an arcuate track for receiving the pivoting device such that the extension section pivots and travels in an arcuate motion when moving between the first extension section orientation and the second extension section orientation.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 6 is a partial cross-sectional side view of the extension section of the ramp assembly of FIG. 1 in an extension section stowed orientation; and FIG. 7 is a partial cross-sectional side view of the extension section of the ramp assembly of FIG. 1 in an extension section extended orientation.

DETAILED DESCRIPTION

Embodiments of the present disclosure are generally directed to ramp assemblies having extension sections for providing a transition surface from a ramp platform to a contact surface, for example, the bed of a truck or the bed in the rear hatch of a vehicle. Referring to FIGS. 1-5, a ramp assembly 20 constructed in accordance with the one embodiment of the present disclosure is shown. The ramp assembly 20 generally includes a ramp platform 22 and at least one extension section 24 that is moveable between an extension section stowed orientation (see FIG. 4) and an extension section extended orientation (see FIG. 5).

Figure 4:
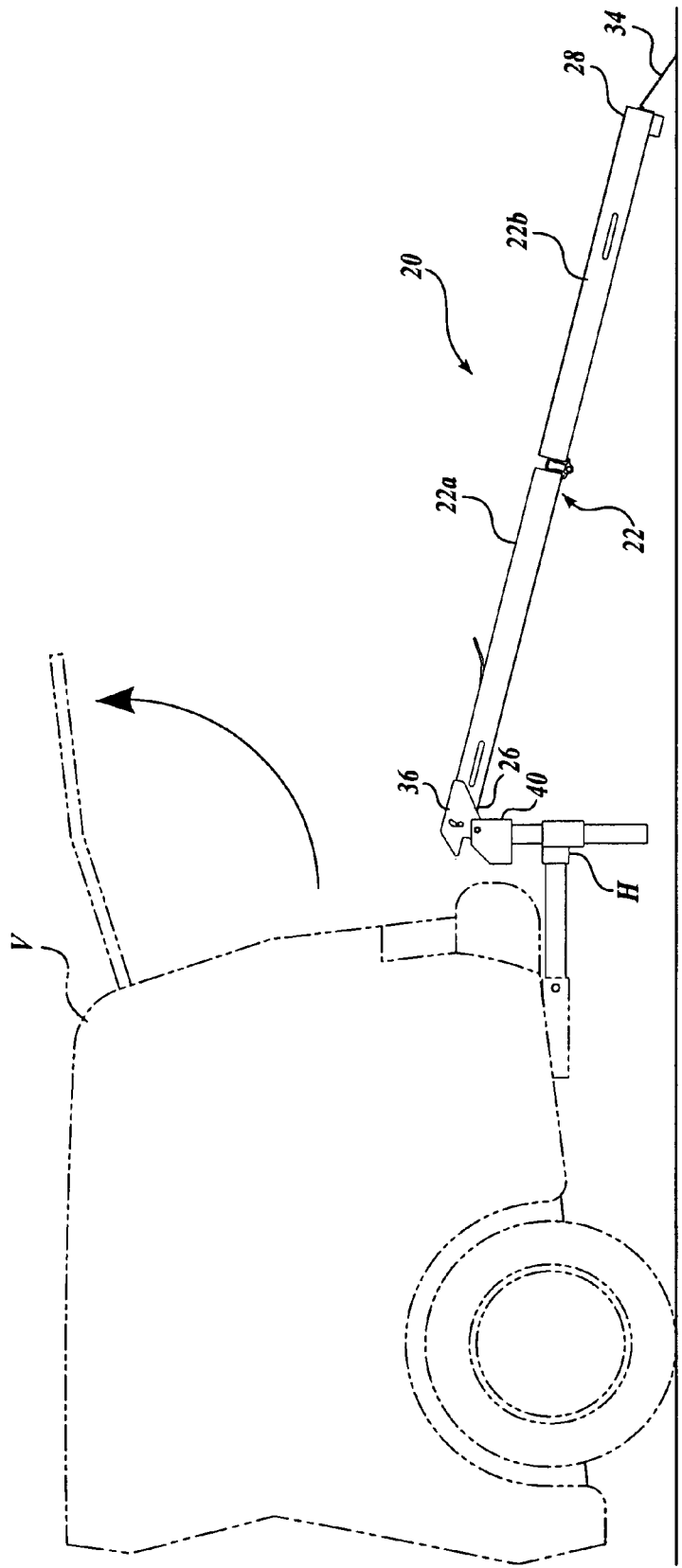
FIG. 4 is a side view of the ramp assembly of FIG. 1, wherein the door of the vehicle is shown being moved into an open position.

When in its extended orientation (see FIG. 5), the extension section 24 aids in overcoming a lip, door jam, molding, or other obstruction that may affect the resting contacts and/or a gap between the ramp platform 22 and an upper elevation surface, as compared to a ramp assembly that does not have an extended extension section (for example, see the gap in FIG. 4, where the extension section 24 is in its stowed orientation). When the ramp assembly 20 is in its stowed orientation (see FIG. 1), the moveable extension section 24 allows the ramp assembly 20 to be foldable and transportable as a compact assembly and to minimize interference with any contact surfaces or vehicle parts.

The ramp platform 22 defines first and second ends 26 and 28 and includes a top substantially planar tread surface 30. In the illustrated embodiment of FIG. 1, the ramp platform 22 is of the foldable type and, as such, comprises a plurality of platform segments 22a and 22b interconnected via a hinge assembly 32. For a more detailed description of one type of foldable ramp platform that may be utilized by embodiments of the ramp assembly 20, see co-pending U.S. patent application Ser. No. 11/517,863, filed on Sep. 6, 2006, titled "Folding Ramp", the disclosure of which is hereby incorporated by reference. However, it should be appreciated that other folding and non-folding ramp assemblies having one or more ramp platform sections are also within the scope of the present disclosure.

Although the extension section 24 is shown as being coupled to the first end 26 of the ramp platform 22, it should be appreciated that in other embodiments of the present disclosure, an extension section may extend from the second end 28 or two extension sections may extend from both the first and second ends 26 and 28 of the ramp platform 22. In the illustrated embodiment, the ramp platform 22 includes a transition plate 34 formed integrally with and extending outwardly from the second end 28 to provide a resting contact from a surface of lower elevation to the ramp platform 22. For a further description of transition plates, see co-pending U.S. patent application Ser. No. 11/697,648, filed on Apr. 6, 2007, titled "Ramp Assembly Including Extension Section", the disclosure of which is hereby incorporated by reference.

Figure 1:
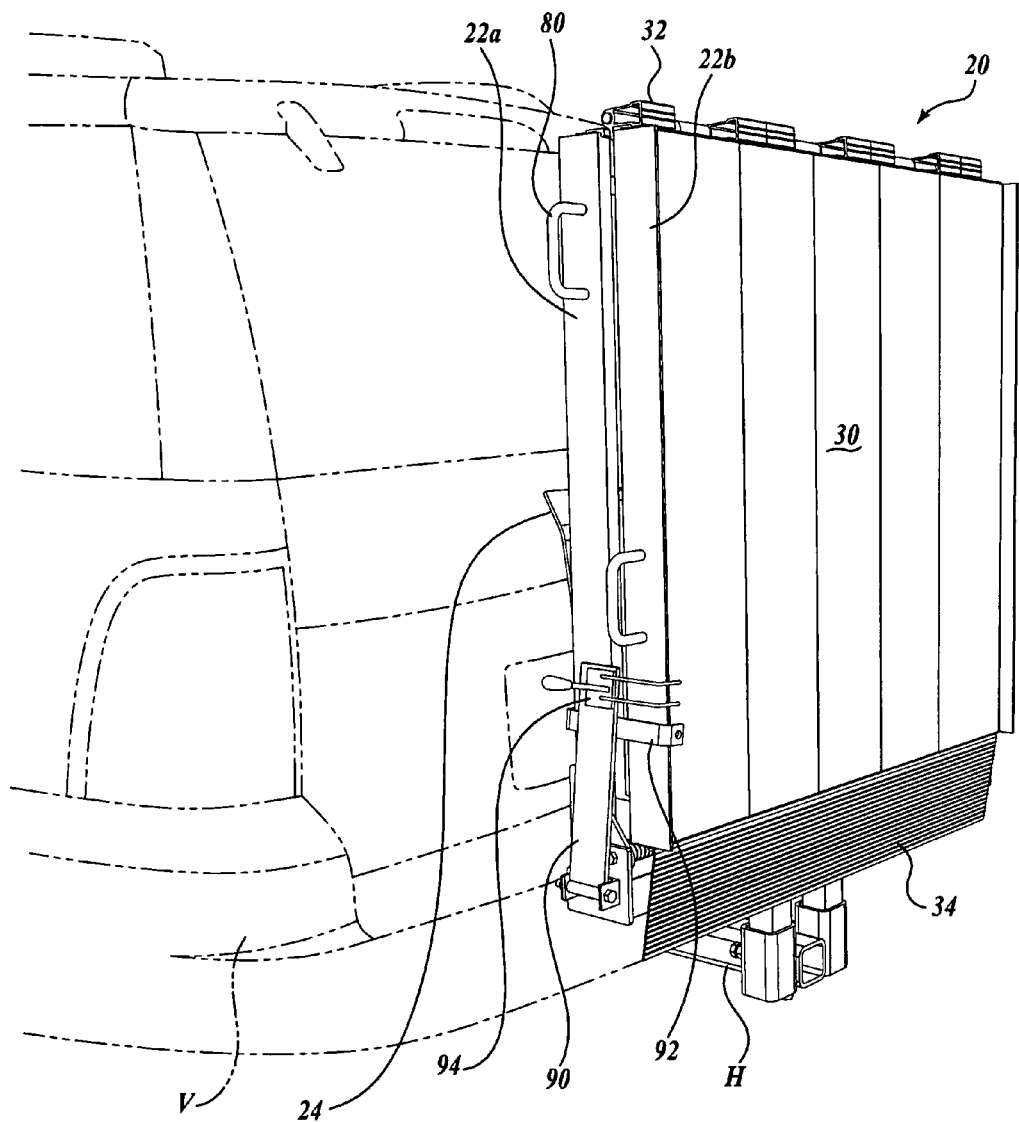
FIG. 1 is a perspective view of an exemplary embodiment of a ramp assembly formed according to various aspects of the present disclosure, wherein the ramp assembly is in a ramp stowed orientation and wherein the ramp assembly is attached to a hitch of a vehicle.

In the illustrated embodiment of FIG. 1, the ramp assembly 20 is attached to the hitch H of a vehicle V and oriented in a ramp stowed orientation, with the extension section 24 in its stowed orientation. In that regard, the first end 26 of the ramp platform 22 includes at least one pivot bracket 36 having a hole 38 for receiving a pivot pin (see FIGS. 6 and 7). Although the side view of the ramp assembly 20 only shows one pivot bracket 36, it should be appreciated that the ramp assembly 20 may include twin pivot brackets for allowing pivoting movement of the ramp assembly 20 relative to the vehicle V.

Figure 3:
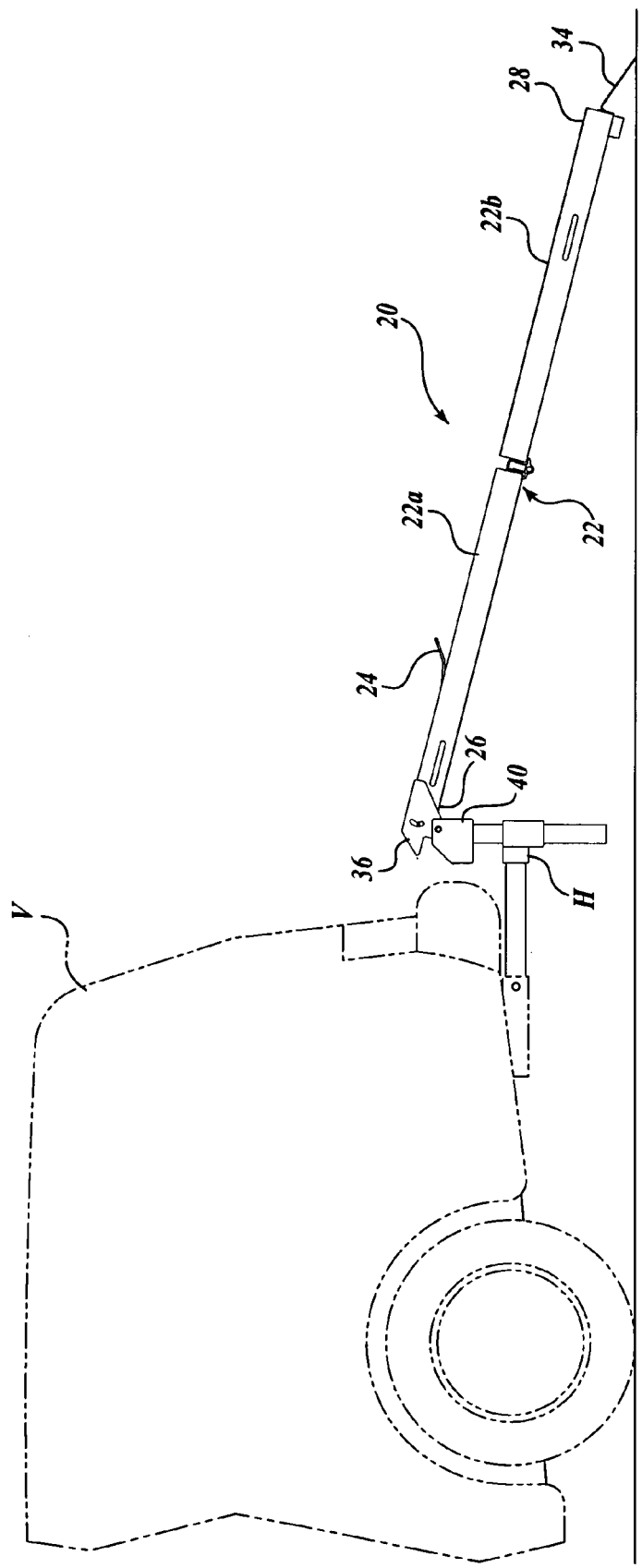
FIG. 3 is a side view of the ramp assembly of FIG. 1, wherein the folding ramp is in the ramp extended orientation.

The pivot bracket 36 is pivotally attached to a hitch support and receiver assembly 40, such that the pivot bracket 36, and hence the ramp assembly 20, is configured to pivot on a hinge attachment between the ramp stowed orientation (see FIG. 1) and the ramp extended orientation (see FIG. 3). As seen in FIG. 1, when in the ramp stowed orientation, the ramp assembly 20 is positioned in a substantially vertical orientation relative to the vehicle V. The stowed orientation of the extension section 24 allows the ramp assembly 20 to pivot on its hinge attachment without interfering with the rear bed of the vehicle V. As can be best understood by referring to FIG. 5, if the extension section 24 was extended in a rigid extended orientation during the transition of the ramp platform 22 into a ramp stowed orientation, the extension section 24 would interfere with the vehicle V and prevent the ramp platform 22 from pivoting on its hinge attachment.

The extension section 24 and its relationship with the ramp platform 22 will now be described in greater detail. As best seen in FIGS. 6 and 7, the extension section 24 is a plate having first and second ends 46 and 48 configured for extending the tread surface of the ramp assembly 20 beyond the ramp platform 22. The first end 46 of the extension section 24 is coupled to the first end 26 of the ramp platform 22 and the second end 48 of the extension section 24 extends outwardly from the ramp platform 22 when the extension section is in an extended orientation (see FIG. 5).

As mentioned above, the extension section 24 is moveably attached to the ramp platform 22. In that regard, the extension section 24 is capable of moving between its stowed orientation (see FIGS. 1-4) and its extended orientation (see FIG. 5). Such moveable attachment is enabled by the interface between the extension section 24 and the ramp platform 22, as described in greater detail below.

The extension section 24 may be pivotably attached to the ramp platform 22, so that it can be "flipped" between stowed and extended orientations (see FIGS. 6 and 7). In that regard, the extension section 24 is configured for engaging with a pivoting device 54. In the illustrated embodiment, the pivoting device 54 is a pivot pin extending the width of and from the sides of the extension section 24. Another suitable pivoting devices besides a pivot pins may include, for example, an integrated construction, such as pivotable protrusions extending from the sides of the extension section 24, etc. The extension section 24 includes a lip 44 configured to rotate around the pivoting device 54. However, it should be appreciated that the extension section may suitably include a bore or a channel for receiving the pivoting device 54 or other suitable configurations for rotating around the pivoting device 54.

The pivoting device 54 is received in a hole in the same pivot bracket 36 at the interface between the extension section 24 and the ramp platform 22 that enables the ramp assembly 20 to pivot on its hinge attachment. As mentioned above, it should be appreciated that the ramp assembly 20 may include twin pivot brackets 36 located on either side of the ramp platform 22, such that the extension section 24 is positioned between the two brackets 36. In the illustrated embodiment, the hole in the pivot bracket 36 includes a slot or track 60 for receiving the pivoting device 54 and allowing the pivoting device 54 to travel between first and second positions in the track 60, as seen by a comparison of the orientations of the pivoting device 54 in the track 60 in FIGS. 6 and 7.

In the illustrated embodiment, the track 60 is in an arcuate configuration to allow the extension section 24 to pivot between the stowed orientation (see FIG. 6) and the extended orientation (see FIG. 7). Although shown in the illustrated embodiment as an arcuate track, it should be appreciated that other non-arcuate, linear, and nonlinear tracks are also within the scope of the present disclosure. The arcuate track 60 allows the lip 44 on the extension section 24 to rotate around the pivoting device 54. As the lip 44 rotates around the pivoting device 54, the extension section pivots from its stowed orientation (see FIG. 6) to its extended orientation (see FIG. 7) and travels in an arcuate path.

The inventors found that an arcuate track 60 allows the extension section 24 to have an improved interface with the ramp platform 22. As a result of the arcuate track 60, when in the stowed orientation (see FIG. 6), at least a portion of the extension section 24 lies substantially flat against the ramp platform 22. Moreover, as a result of the arcuate track 60, when in the extended orientation (see FIG. 7), the extension section 24 forms a flush transition surface with the top tread surface 30 of the ramp platform 22.

If the extension section 24 rotated around a fixed pivoting device, the pivoting device would be located in either the position shown in FIG. 6 or the position shown in FIG. 7. If located in the position shown in FIG. 6, the configuration would result in no flush transition surface between the extension section 24 and the top tread surface 30 of the ramp platform 22 when in the extended orientation. If located in the position shown in FIG. 6, the configuration would result in an extension section 24 that at least a portion of which would not lie substantially flat against the ramp platform 22 when in the stowed orientation. The inventors found that, while a linear track does allow for linear movement of the pivoting device to provide greater advantages over a fixed pivoting device, the pivoting device moves with greater ease in an arcuate track rather than a linear track.

It should be appreciated that the ramp assembly 20 may include a locking mechanism (not shown) to maintain the extension section 24 in this stowed orientation, particularly when the ramp assembly 20 is in a ramp stowed orientation (see FIG. 1). When in the extended orientation (see FIG. 7), the lip 44 on the extension section 24 is received within a groove 64 at the first end 26 of the ramp platform 22 to prevent the extension section 24 from over-rotating beyond the extended orientation. It should further be appreciated that the ramp assembly 20 may further include a locking mechanism (not shown) to maintain the extension section 24 in this extended orientation. However, a locking mechanism is likely not required because gravitational force maintains the extension section 24 in its extended orientation when the ramp assembly 20 is in a ramp extended orientation. Moreover, if the extension section 24 is not locked in the extended orientation, it will merely fold into the ramp platform 22 when the ramp assembly 20 is folded into its stowed orientation (see FIG. 2), preventing damage to the vehicle to which it is providing a transition surface if the extension section 24 is forgotten in the extended orientation.

While the extension section 24 is shown in the illustrated embodiment as being attached to the ramp platform by a pivoting device received in a track, it should be appreciated that other suitable fastening devices are within the scope of the present disclosure. For example, in other embodiments of the present disclosure, the interface between the extension section and the ramp platform may be a pivot interface that does not include a track.

In another embodiment of the present disclosure, the extension section may be configured to retract from its extended orientation by other suitable means besides pivoting. As non-limiting examples, the extension section may be configured to include a suitable linkage device or to slidably retract along a sliding linear track on or adjacent to the ramp platform 22. It should further be appreciated that other retracting configurations are within the scope of the present disclosure.

When in the stowed orientation (see FIG. 1), the extension section 24 is substantially positioned adjacent the ramp platform 22 so as to minimize any interference with the rear bed of the vehicle V. In that regard, the extension section 24 may be a substantially planar extension of the ramp platform 22 or may include substantially planar surfaces that slope relative to one another to overcome a lip, door jam, molding, or other obstruction. In the illustrated embodiment of FIGS. 6 and 7, it can be seen that the extension section 24 includes a plurality of substantially planar sloping portions, which converge at junctures forming obtuse angles therebetween. It should be appreciated that the sloping portions need not be substantially planar and may have curved, curvilinear, arcuate, or other geometrical tread surfaces. For a more detailed description of suitable extension sections that may be utilized by embodiments of the ramp assembly 20, see co-pending U.S. patent application Ser. No. 11/697,648, filed on Apr. 6, 2007, titled "Ramp Assembly Including Extension Section", the disclosure of which is hereby incorporated by reference.

It should be appreciated that the angular orientation of the sloping portions of the extension section 24 aid in overcoming a lip, door jam, molding, or other obstruction that may affect the resting contacts and/or the transition between the ramp platform 22 and, for example, a lower or upper elevation surface. However, the angular orientations of the sloping portions, their relativity to one another, and their relativity to the angular orientation of the ramp platform 22 are dependent on several factors, including but not limited to, the respective lengths of the respective sloping portions and the obstruction that the extension section 24 is designed to overcome.

The ramp assembly 20 described herein can be made from any rigid material known and used in the art. As a non-limiting example, the ramp assembly 20, including the extension section 24, is made of lightweight aluminum. However, lightweight aluminum, as well as other construction materials, can be susceptible to bending or fatigue when under load. Therefore, it should be appreciated that the extension section may include one or more reinforcement bars or devices extending between the lower surfaces of the extension section. The reinforcement devices provide reinforcement to the extension section to prevent bending along the junctures between the sloping portions.

As best seen in FIG. 1, the ramp assembly 20 may include handles 80 located along the sides of the ramp platform 22 for a user to grasp the ramp assembly 20 and manually move it from the ramp stowed orientation to the ramp extended orientation and vice versa.

Still referring to FIG. 1, the ramp assembly may further include a swing-up travel arm 90 for maintaining the ramp assembly 20 in the ramp stowed orientation (see FIG. 1). The travel arm 90 is moveable between an upward engaged orientation (see FIG. 1) and a downward unengaged orientation (not shown). When in the upward engaged orientation, a U-shaped bracket 92 holds the first and second platform segments 22a and 22b together, such that they cannot open into the ramp extended orientation. The travel arm 90 may further include a clamp 94 or other locking device to hold the first and second platform segments 22a and 22b in position. In that regard, the U-shaped bracket 92 further provides reinforcement for a user who is either securing the ramp assembly 20 in the ramp stowed orientation or releasing the ramp assembly 20 in the ramp extended orientation, to prevent the ramp assembly 20 from extending in an uncontrolled manner after the clamp 94 has been released.

Figure 2:
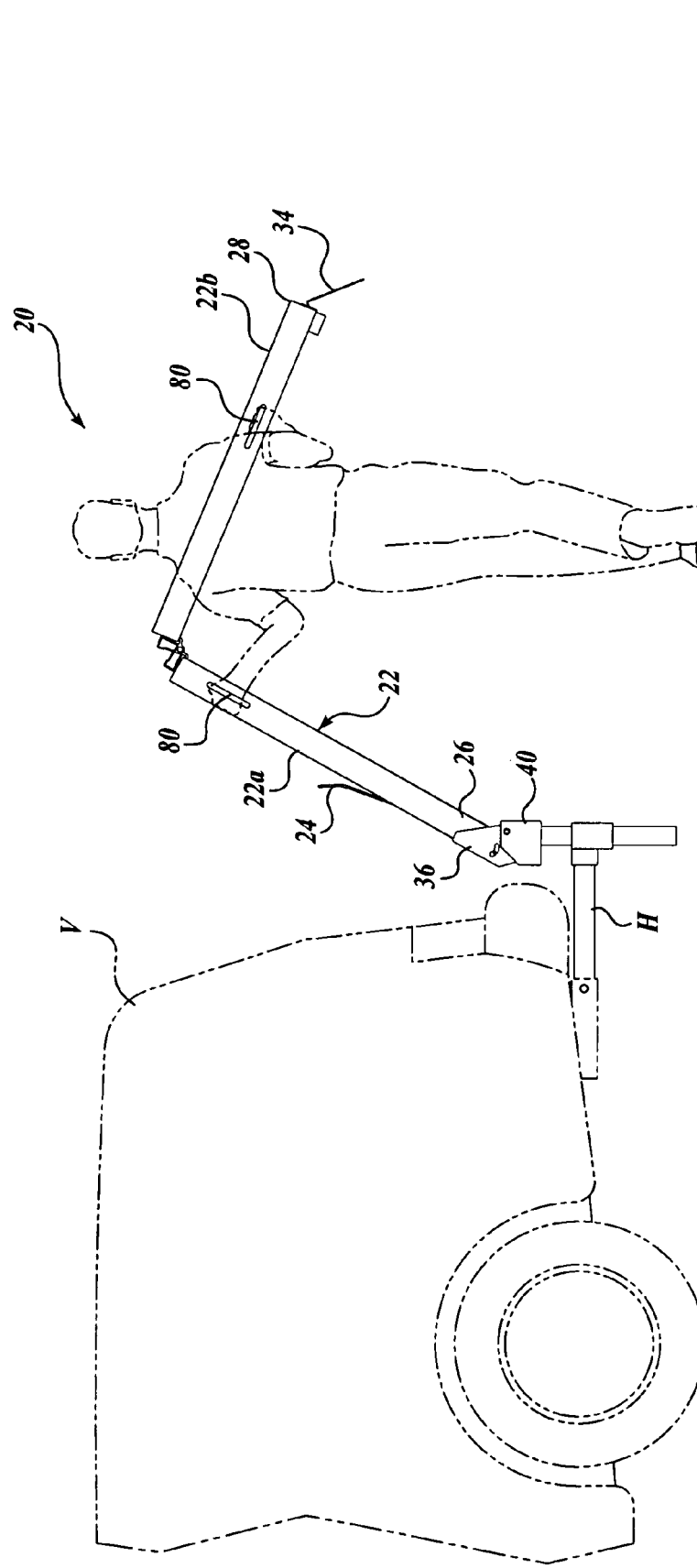
FIG. 2 is a side view of the ramp assembly of FIG. 1, wherein the folding ramp is in transition between the ramp stowed orientation and a ramp extended orientation.
Figure 5:
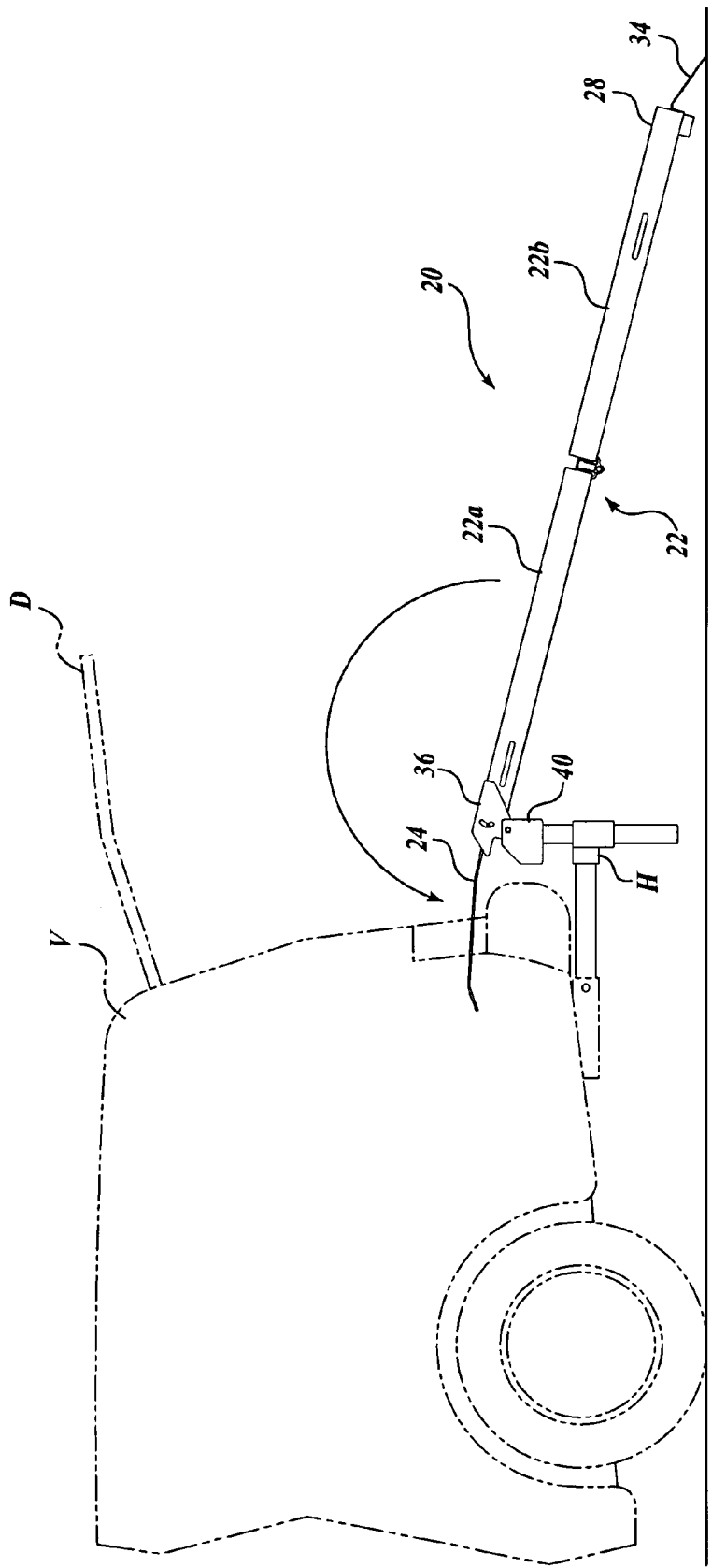
FIG. 5 is a side view of the ramp assembly of FIG. 1, wherein a ramp extension section is shown being moved from an extension section stowed orientation to an extension section extended orientation.

With reference to FIGS. 1-5, the transitions between the different orientations of the ramp assembly 20 when attached to a hitch H of a vehicle V will now be described. Referring to FIG. 1, the ramp assembly 20 is in a ramp stowed orientation as attached to a hitch H of a vehicle V. Referring to FIG. 2, the ramp assembly 20 is shown moving from the ramp stowed orientation to a ramp extended orientation. Referring to FIG. 3, the ramp assembly 20 is shown in the ramp extended orientation. Referring to FIG. 4, when the ramp assembly 20 is in the ramp extended orientation, the door D of the vehicle V can be moved into an open position. Referring to FIG. 5, after the door D of the vehicle V has been moved into an open position, the ramp extension section 24 can be moved from an extension section stowed orientation to an extension section extended orientation without interfering with or hitting the door D of the vehicle V. The reverse process can be used to transition the ramp assembly 20 back to the ramp stowed orientation as seen in FIG. 1.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly for a vehicle, comprising:
    (a) a ramp platform having a top substantially planar tread surface and first and second ends; and
    (b) an extension section movably coupled to the first end of the ramp platform at an interface, wherein the extension section has a length and a thickness, wherein the thickness is substantially constant along the length of the extension section, wherein the extension section is configured to move between a first extension section orientation and a second extension section orientation, and wherein the extension section has at least first and second sloping portions that are fixedly attached to each other to converge at a juncture forming an obtuse angle therebetween when in the first extension section orientation and the second extension section orientation.

2. The ramp assembly of claim 1, wherein the extension section is configured to pivot between the first extension section orientation and the second extension section orientation.

3. The ramp assembly of claim 1, wherein the interface includes a pivoting device and a track for receiving the pivoting device.

4. The ramp assembly of claim 3, wherein the track is an arcuate track.

5. The ramp assembly of claim 3, wherein the track is a non-arcuate track.

6. The ramp assembly of claim 1, wherein the extension section is configured to pivot and travel in an arcuate motion when moving between the first extension section orientation and the second extension section orientation.

7. The ramp assembly of claim 1, wherein the first extension section orientation is a stowed orientation.

8. The ramp assembly of claim 1, wherein the second extension section orientation is an extended orientation.

9. The ramp assembly of claim 1, wherein the ramp platform is movable between a first ramp orientation and a second ramp orientation.

10. The ramp assembly of claim 9, wherein the first ramp orientation is a stowed orientation.

11. The ramp assembly of claim 10, wherein the ramp assembly is in a substantially vertical orientation relative to the vehicle when in the stowed orientation.

12. The ramp assembly of claim 9, wherein the second ramp orientation is an extended orientation.

13. The ramp assembly of claim 1, wherein the ramp assembly is mountable to the hitch of a vehicle.

14. The ramp assembly of claim 1, wherein the ramp assembly includes a releasable travel arm having a U-shaped bracket for maintaining the ramp assembly in a first ramp orientation.

15. A ramp assembly for a vehicle, comprising:
    (a) a ramp platform having a top substantially planar tread surface and first and second ends, wherein the ramp platform is movable between a first ramp orientation and a second ramp orientation; and
    (b) an extension section pivotally coupled to the first end of the ramp platform to provide a transition surface from the first end of the ramp platform to the vehicle, wherein the extension section is configured to pivot between a first extension section orientation corresponding with the first ramp orientation and a second extension section orientation corresponding with the second ramp orientation, and wherein the extension section has a first side and second side and at least first and second sloping portions that are fixedly attached to each other to converge at a juncture forming an external obtuse angle therebetween on the first side and an internal obtuse angle therebetween on the second side when in the first extension section orientation and the second extension section orientation.

16. The ramp assembly of claim 15, wherein the interface includes a pivoting device and a track for receiving the pivoting device.

17. The ramp assembly of claim 16, wherein the track is an arcuate track.

18. The ramp assembly of claim 15, wherein the extension section is configured to pivot and travel in an arcuate motion when moving between the first extension section orientation and the second extension section orientation.

19. A ramp assembly for a vehicle, comprising:
    (a) a ramp platform having a top substantially planar tread surface and first and second ends; and
    (b) an extension section pivotally coupled to the first end of the ramp platform at an interface to provide a transition surface from the first end of the ramp platform to the vehicle, wherein the extension section is configured to pivot between a first extension section orientation and a second extension section orientation, wherein the interface includes a pivoting device and an arcuate track for receiving the pivoting device such that the extension section pivots and travels in an arcuate motion when moving between the first extension section orientation and the second extension section orientation, and wherein the extension section has a first side and second side and at least first and second sloping portions that are fixedly attached to each other to converge at a juncture forming an external obtuse angle therebetween on the first side and an internal obtuse angle therebetween on the second side when in the first extension section orientation and the second extension section orientation.

* * * * *